United States Patent [19]
Barnard

[11] Patent Number: 5,634,379
[45] Date of Patent: Jun. 3, 1997

[54] ADJUSTABLE CABLE ASSEMBLY

[75] Inventor: Michael A. Barnard, Wichita, Kans.

[73] Assignee: Wescon Products Company, Wichita, Kans.

[21] Appl. No.: 471,089

[22] Filed: Jun. 6, 1995

[51] Int. Cl.$^6$ .................................................. F16C 1/16
[52] U.S. Cl. ........................................ 74/502.6; 74/502.4
[58] Field of Search ............................ 71/500.5, 501.5 R, 71/502, 502.4, 502.6

[56] References Cited

U.S. PATENT DOCUMENTS

| | | | |
|---|---|---|---|
| 4,274,300 | 6/1981 | Golobay | 74/501.5 R |
| 4,304,149 | 12/1981 | Heimann | 74/502.4 |
| 5,002,315 | 3/1991 | Bartholomew | 74/502.4 |
| 5,142,933 | 9/1992 | Kelley | 74/501.5 R |
| 5,188,115 | 2/1993 | Otani | 74/501.5 R |
| 5,394,770 | 3/1995 | Boike et al. | 74/501.5 R |
| 5,398,566 | 3/1995 | Moore | 74/501.5 R |
| 5,435,202 | 7/1995 | Kitamura | 74/501.5 R |

*Primary Examiner*—Charles A. Marmor
*Assistant Examiner*—Mary Ann Battista
*Attorney, Agent, or Firm*—Hovey, Williams, Timmons & Collins

[57] ABSTRACT

A cable assembly for use in transmitting movement between an actuating mechanism and an actuated mechanism includes an adjustment apparatus for use in removing slack between the ends of the cable of the assembly. The adjustment apparatus includes an elongated fitting including a first end adapted for attachment to a conduit within which the cable is supported, and a second free end having a non-circular cross-sectional shape. A housing presents a non-circular bore sized for receipt of the second end of the fitting so that engagement between the fitting and the bore prevents the fitting from rotating relative to the housing. The fitting is axially shiftable within the bore between a plurality of positions to adjust the length of conduit extending through the housing. A button is supported on the housing for selectively locking the fitting in place within the bore and unlocking the fitting for axial movement.

7 Claims, 1 Drawing Sheet

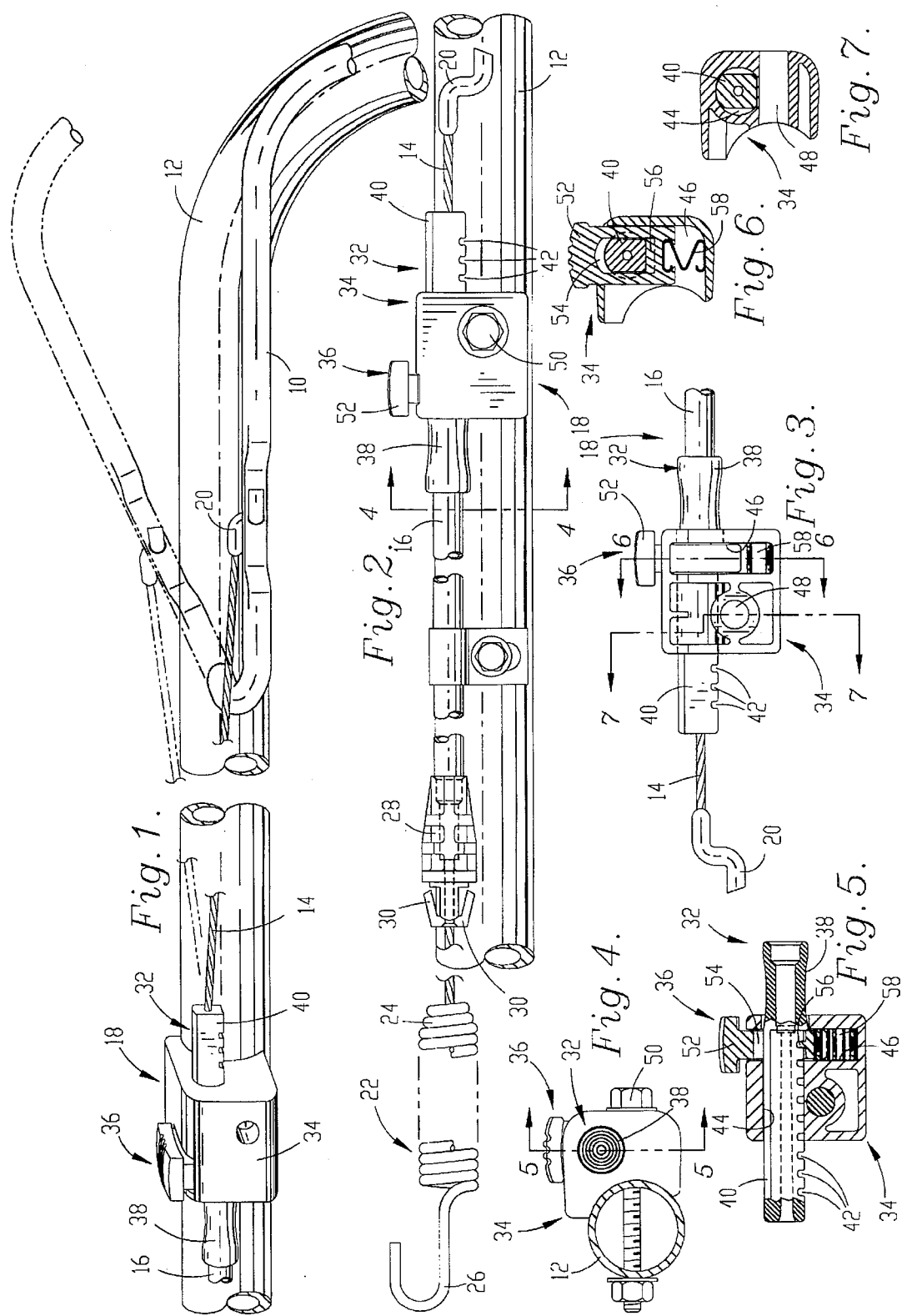

ADJUSTABLE CABLE ASSEMBLY

BACKGROUND OF THE INVENTION

1. Field of the Invention

The present invention relates generally to cable control devices and, more particularly, to an adjustable cable assembly for use in removing slack between the ends of a cable in such a control device.

2. Discussion of the Prior Art

It is known to provide a cable assembly for use on a walk-behind lawnmower for transmitting movement between an actuating lever mounted on the handlebar of the lawnmower and a ground drive control mechanism or the like mounted on the mower deck remote from the handlebar. The cable assembly includes a cable that is supported for translational movement within an outer conduit, wherein the cable is connected between the actuating lever and the ground drive control mechanism, and the conduit is fixed in place on the lawnmower.

Under usage conditions, the effects of aging and wear tend to loosen the cable of the assembly, creating slack in the coupling between lever and the ground drive control mechanism. Such slack must be removed in order to maintain proper functioning of the assembly. It is known to provide an adjustment coupling for adjusting the position of one end of the conduit in order to take up the slack in the cable. The adjustment coupling includes a pair of elements, one of which may be threaded into and out of the other to permit the position of the one end of the conduit to be adjusted.

The known construction requires substantial effort to achieve tightening of the cable since it is necessary to rotate the elements one full rotation relative to one another in order to achieve a longitudinal adjustment equal to one pitch of the threads.

OBJECTS AND SUMMARY OF THE INVENTION

It is an object of the present invention to provide an adjustment apparatus for a cable assembly, wherein slack can be removed from between the ends of the assembly by simply shifting an end fitting of the conduit relative to a housing of the apparatus and locking the end fitting in the adjusted position. Thus, removing slack from the system can be accomplished quickly and with little effort.

It is another object of the invention is to provide an adjustment apparatus that is easy to manufacture and assemble, and that is easy to operate for permitting repeated adjustment.

In accordance with these and other objects evident from the following description of a preferred embodiment of the invention, an adjustable cable assembly is provided for use in transmitting movement between an actuating mechanism and an actuated mechanism, the assembly includes a cable having a first end adapted for connection to the actuating mechanism and an opposed second end adapted for connection to the actuated mechanism. A conduit is also provided, the cable being received in the conduit and movable axially to transmit movement of the actuating mechanism to the actuated mechanism. The conduit includes an end fitting at one end thereof, at least a portion of which has a non-circular cross-sectional shape. The end of the conduit opposite the end fitting is fixed in place on the assembly, and the end fitting itself is supported by a housing that is fixed in place on the assembly. The housing includes a non-circular bore sized for receipt of the end fitting so that engagement between the end fitting and the bore prevents the fitting from rotating relative to the housing. The end fitting is axially shiftable within the bore between a plurality of positions to adjust the length of conduit extending between the fixed end of the conduit and the housing. A locking means is supported on the housing for selectively locking the fitting in place within the bore and unlocking the fitting for axial movement within the bore.

Thus, the adjustment apparatus of the assembly includes the elongated fitting, the housing, and the locking means supported on the housing for selectively locking the fitting in place within the bore and unlocking the fitting for axial movement within the bore. By providing a construction in accordance with the present invention, numerous advantages are realized. For example, by providing an end fitting for the conduit that is axially shiftable to adjust the position of the conduit relative to the housing, and by providing a means for locking the fitting in place in an adjusted position, slack can be removed from between the ends of the assembly quickly and with little effort. In addition, an apparatus results that is easy to manufacture, includes relatively few parts, and permits repeated take-up of slack in the assembly.

BRIEF DESCRIPTION OF THE DRAWING FIGURES

The preferred embodiment of the invention is described in detail below with reference to the attached drawing figures, wherein:

FIG. 1 is a fragmentary perspective view of a walk-behind lawn mower handle bar assembly, illustrating an adjustable cable assembly constructed in accordance with the preferred embodiment;

FIG. 2 is a fragmentary side elevational view of the cable assembly;

FIG. 3 is a fragmentary reverse side elevational view of a cable adjustment apparatus forming a part of the cable assembly;

FIG. 4 is a sectional view taken along line 4—4 of FIG. 2;

FIG. 5 is a sectional view taken along line 5—5 of FIG. 4;

FIG. 6 is a sectional view taken along line 6—6 of FIG. 3; and

FIG. 7 is a sectional view taken along line 7—7 of FIG. 3.

DETAILED DESCRIPTION OF A PREFERRED EMBODIMENT

An adjustable cable assembly for use in transmitting movement between an actuating mechanism and an actuated mechanism is illustrated in FIG. 1. In the preferred embodiment, the assembly is employed in the ground drive assembly of a walk-behind lawnmower, wherein the lawnmower is conventional, including a mower deck supported on wheels, a blade suspended from the deck, an engine or motor supported on the deck and connected to the blade, a shroud or cover extending over the engine or motor elements, and a handlebar extending upward from the deck and supporting a hand-actuated bale or lever.

The actuating mechanism of the cable assembly in the preferred embodiment is the lever or bale 10 that is mounted on the handlebar 12 of the lawnmower, and the actuated mechanism is a drive control mechanism such as a gear box or clutch mounted on the lawnmower deck. The drive control mechanism is interposed in the ground drive system to control the transmission of drive to the wheels of the mower.

The cable assembly broadly includes a cable 14, a conduit 16 within which the cable is received, and an adjustment apparatus 18. As illustrated in FIG. 2, the cable 14 is of a multi-strand metal construction well suited for transmitting movement of the lever or bale 10 to the drive control mechanism. However, any other cable material may be used so long as the material is capable of bearing the loads necessary to permit the cable to transmit forces between the actuating mechanism and the actuated mechanism of any assembly within which the cable is used.

Each end of the cable is provided with a connector for enabling the cable to be attached to the bale at one end and to the drive control mechanism at the other end. The connector 20 at the bale end of the cable is generally S-shaped, presenting a hook portion adapted to engage a hole in the bale that extends in a direction transverse to the length of the cable. The connector 22 at the lower end of the cable includes a tension spring 24 for maintaining tension of a predetermined magnitude between the cable and the drive mechanism. A hook portion 26 is formed at the distal end of the spring for engaging the drive mechanism.

The conduit 16 is preferably a Bowden wire conduit which includes a wire that is coiled like a spring. Alternately, the conduit may be formed of multiple wires that are wound in a helix. These constructions provide a flexible conduit that receives the cable for relative axial shifting movement while restricting buckling of the cable. If desired, a thermoplastic resin material can be extruded or otherwise applied over the conduit for weatherproofing purposes.

Each end of the conduit is provided with a fitting for supporting the conduit on the lawnmower. The fitting 28 at the lower end of the conduit is tubular, presenting a first end that is press-fit or otherwise attached to the conduit, and a second free end. The free end includes a means for providing a snap-fit connection between the fitting and the shroud. This means preferably includes a pair of spring-biased fingers 30 that are compressed inward as the free end is pushed through the opening, and expand radially outward on the inside of the shroud to retain the fitting within the opening. The cable 14 extends through the fitting and the shroud, and is connected to the drive control mechanism.

The fitting 32 at the upper end of the conduit forms a part of the adjustment apparatus of the present invention, wherein the apparatus also includes a housing 34 that receives the fitting and is secured to the handlebar of the lawnmower, and a locking means 36 for selectively locking the fitting in place relative to the housing and for unlocking the fitting for movement.

As shown in FIG. 5, the fitting 32 is an elongated tubular piece through which the cable extends, and includes two axial segments 38, 40. The first segment 38 includes an inner surface sized for press-fit engagement with the upper end of the conduit. The outer surface of the first segment is generally cylindrical, as shown in FIG. 4, and presents a concave gripping surface, shown in FIG. 3, by which the fitting can be manipulated. As shown in FIG. 7, the second segment 40 of the fitting is formed with flat bottom and side walls and a curved top wall having a diameter substantially equal to the diameter of the outer surface of the first segment. Turning to FIG. 5, the bottom wall includes a plurality, e.g. nine, notches 42 formed in the wall and extending in a direction generally transverse to the length of the fitting. The second segment extends along about two-thirds of the total length of the fitting.

The housing 34 is preferably formed of a single molded piece of thermoplastic resin or any other suitable material, and presents a longitudinally extending bore 44 sized for receipt of the fitting 32. Preferably, as shown in FIG. 7, the bore is generally cylindrical, having a diameter equal to the diameter of the first segment of the fitting. However, at least a section of the bore includes a flat, chordal bottom wall adapted to engage the bottom wall of the fitting to prevent the fitting from being rotated within the bore. As shown in FIG. 5, a slot 46 is formed in the top of the housing and intersects the bore at a right angle. As described below, the slot 46 is sized for receipt of the locking means. Preferably, the section of the bore extending between the slot and the nearest end of the housing is circular, and is adapted to receive both the first and second segments of the fitting so that the first segment of the fitting can be moved into the bore, increasing the total range of movement of the fitting relative to the housing.

As shown in FIG. 7, the housing 34 includes a pair of opposed sides, one of which is curved so that the housing nests against the handlebar 12 of the lawnmower when the adjustment apparatus is positioned on the handlebar in the position shown in FIG. 4. A hole 48 extends through the housing in a direction transverse to the bore, as shown in FIG. 3, and is adapted to receive a suitable fastener for securing the housing to the handlebar. Returning to FIG. 4, the fastener 50 is shown as extending through both the housing 34 and the handlebar 12.

The locking means 36 is provided for locking the fitting in place within the bore of the housing, and for permitting the fitting to be unlocked for movement within the bore to permit the upper end of the conduit to be shifted relative to the lower end. By conducting this relative movement between the ends of the conduit, the path of the cable from the fitting 28 to the adjustment apparatus 18, both of which are fixed relative to the lawnmower, is varied. Thus, it is possible to remove slack from the cable quickly and without repositioning the various components of the cable assembly.

Preferably, as shown in FIG. 6, the locking means 36 includes a button 52 movable within the slot 46 in a direction transverse to the bore 44 between a raised locking position in which the button engages one of the notches in the bottom wall of the fitting to lock the fitting in place, and a depressed unlocking position in which the button releases the fitting for movement relative to the housing. The button 52 is formed of a single piece of metal or other suitable material, and includes an upper end that protrudes from the slot for engagement by an operator, and an elongated body that extends into the slot beyond the bore. The body includes an opening 54 that is aligned with the bore when the button is positioned in the slot. As shown in FIG. 5, a tooth 56 extends across the lower end of the opening 54 in a direction transverse to the bore and parallel to the notches in the fitting. The tooth is sized for receipt in the notches to lock the fitting against movement relative to the housing.

Returning to FIG. 6, the lower end of the button body includes a C-shaped groove extending in a direction parallel to the bore. This groove retains a biasing means for biasing the button toward the raised locking position. Preferably, the biasing means includes a generally M-shaped, metal compression spring 58 having curled ends, one of which is retained in the C-shaped groove, and the other of which extends downward beyond the body into engagement with the bottom wall of the slot in the housing. When the button 52 is depressed against the biasing force of the spring 58, the tooth 56 is lowered out of engagement with the notches 42 of the fitting so that the fitting can be axially shifted within the bore. When the button is released, the spring 58 returns the button to the raised position, bringing the tooth 56 into engagement with one of the notches 42 to hold the fitting in whatever position it is disposed.

When used on the cable assembly of a ground drive control system in a walk-behind mower, the adjustment apparatus 18 can be employed to remove slack from the cable that develops after a period of use. This is done simply by depressing the button 52 on the adjustment apparatus and axially shifting the fitting 32 relative to the housing 34 so that the path defined between the adjustment apparatus 18 and the end fitting 28 at the lower end of the conduit is lengthened. Thus, the cable 14 is tightened to again transmit movement of the bale to the drive control mechanism without any looseness or play in the cable assembly. Once adjustment is complete, the button is released and is biased to the locked position, securing the fitting in the adjusted position.

Although the present invention has been described with reference to the preferred embodiment illustrated in the attached drawing figures, it is noted that substitutions may be made and equivalents employed herein without departing from the scope of the invention as recited in the claims.

What is claimed is:

1. An adjustable cable assembly for use in transmitting movement between an actuating mechanism and an actuated mechanism, the assembly comprising:

a cable having a first end adapted for connection to the actuating mechanism and an opposed second end adapted for connection to the actuated mechanism;

a conduit presenting opposed ends and including an end fitting at one of the ends, at least a portion of the length of the end fitting having a non-circular cross-sectional shape and a plurality of longitudinally spaced notches, the cable being received in the conduit and movable axially to transmit movement of the actuating mechanism to the actuated mechanism;

a fastening means for fixing the end of the conduit opposite the end fitting in place on the assembly;

a housing fixed in place on the assembly and including a non-circular bore sized for receipt of the end fitting so that engagement between the end fitting and the bore prevents the fitting from rotating relative to the housing, the end fitting being axially shiftable within the bore between a plurality of positions to adjust the length of the conduit extending between the fastening means and the housing; and a locking means supported on the housing for selectively locking the fitting in place within the bore and unlocking the fitting for axial movement within the bore, the locking means including a unitary button movable in a direction transverse to the bore between a locking position in which the button engages at least one of the notches in the fitting to lock the fitting in place within the bore and an unlocking position in which the button releases the notches to unlock the fitting for movement within the bore, the button including opposed outer and inner ends, and a spring for biasing the button toward the locking position, wherein the inner end of the button includes a transverse groove within which an end of the spring is secured, wherein the housing includes a slot extending into the housing in the direction transverse to the bore and the button and the spring are sized for sliding receipt in the slot, the button including a hole extending in a direction parallel to the bore so that when the button is pushed into the slot, compressing the spring, the hole is aligned with the bore and the end fitting is axially shiftable axially within the bore.

2. A cable assembly as recited in claim 1, wherein the spring includes an M-shaped configuration.

3. A cable assembly as recited in claim 1, wherein the end fitting includes an elongated, hollow body presenting a first end sized for press-fit engagement with the one end of the conduit.

4. A cable assembly as recited in claim 1, wherein the button includes an upstanding tooth extending along the bottom of the hole, the tooth engaging one of the notches when the button is released and biased to the locking position.

5. A cable adjustment apparatus for use with a cable that is supported for translational movement within an outer conduit, the apparatus comprising:

an elongated fitting including a first end adapted for attachment to the conduit, and a second free end having a non-circular cross-sectional shape and a plurality of longitudinally spaced notches;

a housing presenting a non-circular bore sized for receipt of the second end of the fitting so that engagement between the fitting and the bore prevents the fitting from rotating relative to the housing, the fitting being axially shiftable within the bore between a plurality of positions; and a locking means supported on the housing for selectively locking the fitting in place within the bore and unlocking the fitting for axial movement within the bore, the locking means including a unitary button movable in a direction transverse to the bore between a locking position in which the button engages at least one of the notches in the fitting to lock the fitting in place within the bore and an unlocking position in which the button releases the notches to unlock the fitting for movement within the bore, the button including opposed outer and inner ends, and a spring for biasing the locking means toward the locking position, wherein the inner end of the button includes a transverse groove within which an end of the spring is secured, wherein the housing includes a slot extending into the housing in the direction transverse to the bore and the inner end of the button and the spring are sized for sliding receipt in the slot, the button including a hole extending in a direction parallel to the bore so that when the button is pushed into the slot, compressing the spring, the hole is aligned with the bore and the end fitting is axially shiftable axially within the bore.

6. A cable adjustment apparatus as recited in claim 5, wherein the spring includes an M-shaped configuration.

7. A cable adjustment apparatus as recited in claim 5, wherein the button includes an upstanding tooth extending along the bottom of the hole, the tooth engaging one of the notches when the button is released and biased to the locking position.

* * * * *